June 30, 1936.  A. M. WILSON ET AL  2,045,740
FILTER PRESS
Filed Dec. 30, 1933   2 Sheets-Sheet 1
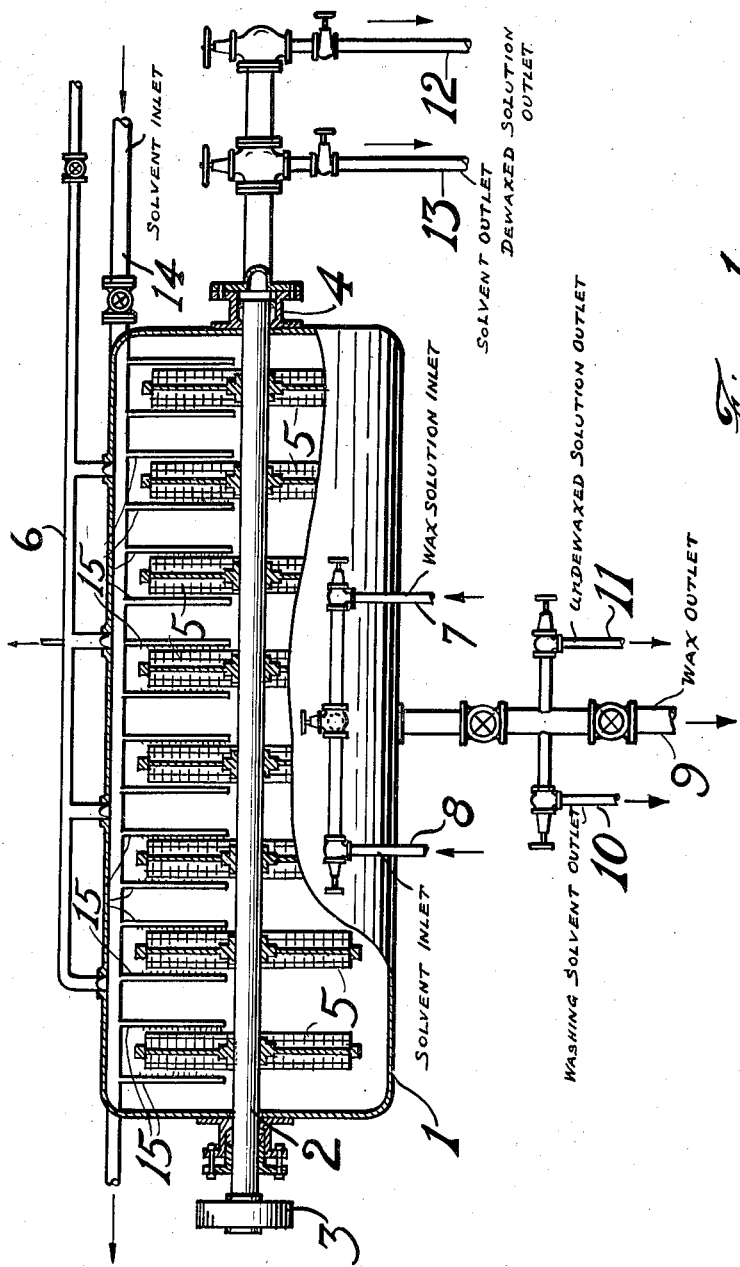
Arthur M. Wilson
Ogden E. Crosby  Inventors
W. E. Currie  Attorney June 30, 1936. A. M. WILSON ET AL 2,045,740
FILTER PRESS
Filed Dec. 30, 1933 2 Sheets-Sheet 2

Arthur M. Wilson Inventors
Ogden E. Crosby
W. E. Currie Attorney

Patented June 30, 1936

2,045,740

UNITED STATES PATENT OFFICE 2,045,740

FILTER PRESS

Arthur M. Wilson, Cranford, and Ogden E. Crosby, Linden, N. J., assignors to Standard Oil Development Company, a corporation of Delaware Application December 30, 1933, Serial No. 704,674

4 Claims. (Cl. 210—200)

This invention relates to an improvement in filter presses and will be understood from the following description when reading in conjunction with the drawings:

Fig. 1 of which is a longitudinal section through a rotary filter press;

Figure 3:
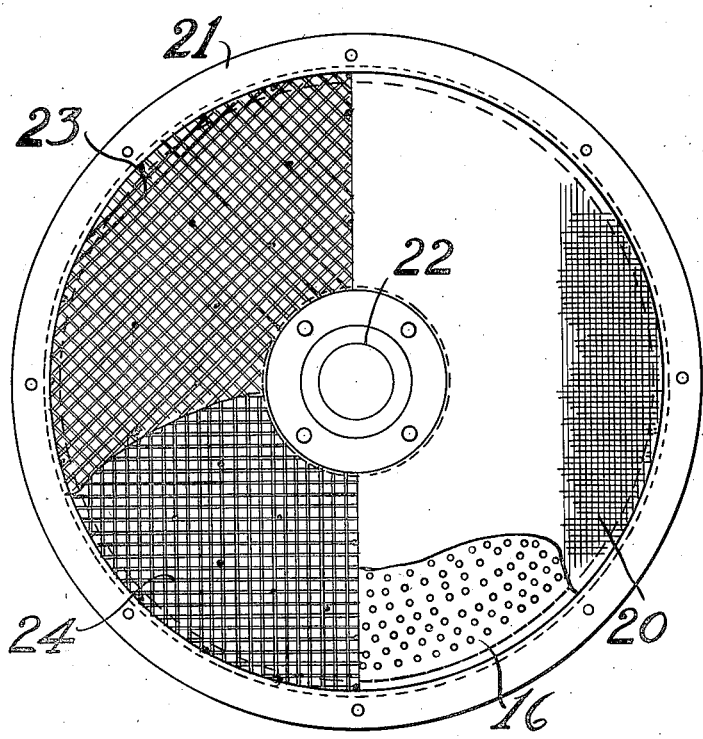
Fig. 3 is a front view of a filter leaf.

In the art of filtration for the purpose of separating solids from liquids such as, for example, wax from petroleum oil admixed with a solvent, it is customary to use either stationary or rotary filter presses. In principle, such filter presses consist of a casing in which several filter leaves are arranged covered with a filter blanket through which the liquid passes, but the solid is retained on its surface. The filter blanket may consist either of a cloth or of very fine wire screen. Liquid to be filtered is admitted to the casing and then forced by a pressure difference through the filter blanket and filter leaves from the interior of which it is removed while the solid accumulates on the exterior surface of the blankets. The filter leaves with the blanket may be stationary or may be rotated. The pressure difference is either produced by positive pressure or by vacuum applied to the interior of the filter leaves.

We have discovered that the operation of the filter press is greatly improved by placing one or several coarse wire screens at central distances in front of the filter blankets.

Referring now to Figure 1, the numeral 1 designates the filter casing 1, a hollow shaft 2 which can be rotated by means of a pulley 3. The shaft is provided with an extension with which it is connected by means of gland 4. The filter leaves 5 are attached to the hollow shaft. 6 designates a line for releasing air from the press during charging. 7 is the inlet line for the waxy solution and 8 an inlet line for the solvent. 9 is the discharge line for the wax, 10 the discharge line for washing solvent remaining in the press after washing and 11 is the discharge line for unde-waxed solution. Lines 12 and 13 designate the discharge lines for solvent used in washing the wax cake and for the dewaxed solution respectively.

Figure 2:
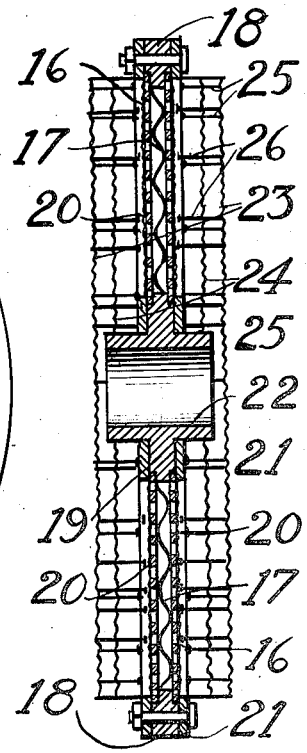
Fig. 2 is an enlarged section through a filter leaf.
Figure 5:
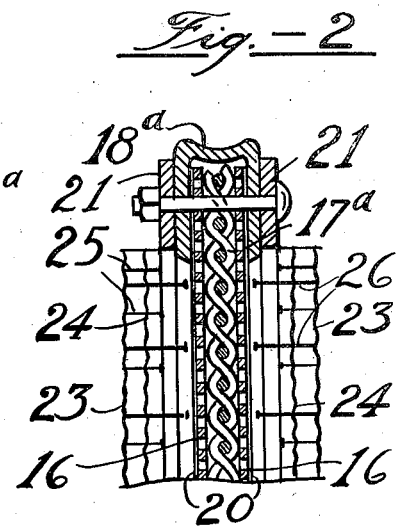
Fig. 5 is a section taken at II—II of Fig. 4.

The solvent line 14 runs the full length inside the press and has attached thereto spray tubes 15. Referring to Figs. 2 and 5, the filter leaf itself consists of two round perforated plates 16 which are held apart by the coarse wire screen 17. The plates and screen are fabricated into a rigid unit with the recessed rings 18 and 19. The filter cloths 20 are clamped on either side of the leaf by means of clamping rings 21. The hub 22 is key seated to fit the hollow shaft. Appropriate ports are provided to allow the liquid to flow from the inner part of the leaves into the hollow shaft. The coarse, wire screens of the present invention are shown at 23 and 24. They are attached by means of supports 25 to clamping rings 21. Soldering provides the simplest attachment of supports 25 to the rings 21 and also to the coarse wire screens. Other supports 26 are soldered to the coarse screen and are rounded at their open end which faces the filter cloth to prevent piercing of the cloth.

Figure 3 shows a view of a filter leaf with the coarse wire screen of the present invention. On one side of the figure the screen is removed to show the filter cloth underneath.

Figure 4:
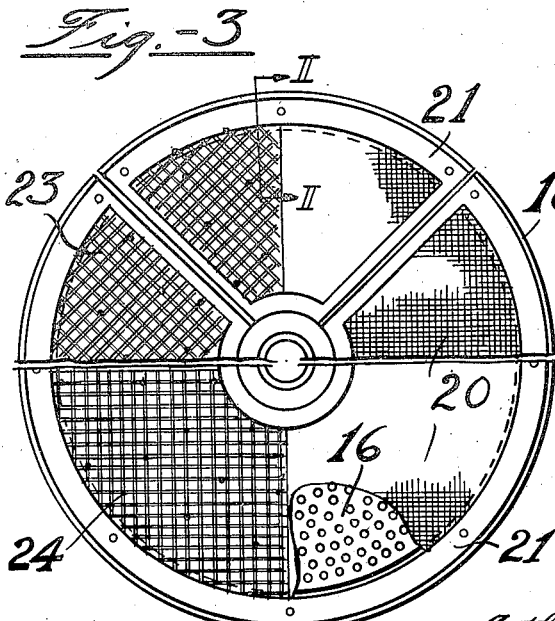
Fig. 4 is a similar view of a filter leaf consisting of several segments.

In the filter press illustrated in Figures 1 and 2, the filter leaves are one unit and the clamping rings are the standard equipment so that the screens may be attached to these. In other presses, however, no clamping ring is present and in such cases the filter leaf may be provided with one or two rings to which the coarse wire screen of the present invention is attached. Furthermore, the filter leaf may consist of several segments, as shown in Figure 4. In this case two methods of attaching the coarse screens are possible.

(1) One screen may be used for the entire leaf.

(2) An independent screen may be used for each segment. The latter method is preferred because faulty leaf segments may be replaced without disturbing the remainder of the leaf.

A suitable distance of the coarse wire screens of the present invention is about half an inch from each other and from the filter blanket. This distance may, however, be considerably varied.

The wire screen or screens placed in front of the filter blanket prevents the troublesome slipping of the solid material such as wax cakes which builds up on the blanket during the filtering operation. Although the use of such screens shows certain advantages with stationary filters, the greatest benefit is obtained from its use with rotary filters.

After a sufficiently thick layer of solid builds up on the filter blanket, the filtering operation is discontinued, the unfiltered liquid present in the filter case is removed, and the deposited solid is usually submitted to washing with a clean solvent. The wire screen of the present invention will not only prevent the slipping or dislocation of the cake during the washing operation but more especially during the removal of the unfiltered liquid from the press.

This invention is not to be limited by the particular details given for the purpose of illustrating the invention but only by the following claims in which it is our intention to claim all novelty inherent in the invention.

What we claim is:

1. In combination with a rotary filter press a filter leaf, a filter blanket on said leaf and a ring for keeping the filter blanket in close contact with the filter leaf, and a coarse wire screen rigidly attached to said ring so as to be maintained at a suitable distance from and substantially parallel to the filter blanket whereby the filter cake formed on the blanket is maintained in substantially fixed relationship thereto.

2. In a filter press, a filter leaf carrying a filter blanket and a pair of clamping rings for the blanket, the improvement comprising a coarse wire screen rigidly supported on the rings, in spaced and parallel relationship thereto, by means of a plurality of supports affixed to the screen and to the rings at suitable points thereon, whereby the filter cake formed on the blanket is substantially maintained in contact therewith during filtering and washing operations.

3. In combination with a circular filter leaf, carrying a filter blanket, clamping members for the filter leaf comprising a pair of concentric ring members and a coarse wire screen rigidly secured to said ring members in spaced and parallel relationship thereto and to the filter blanket, said screen bearing a plurality of supporting members affixed at various points upon the inwardly faced surface of the screen, extending into spaced relationship with the filter blanket and adapted to engage the blanket under pressure without piercing said blanket.

4. Apparatus according to claim 2 in which the clamping rings are formed of a plurality of frame members in the form of truncate sectors of a circle, adapted to provide for radial engagement of the blanket with the filter leaf, each frame member carrying a coarse wire screen rigidly supported thereon, by means of a plurality of supports affixed to the screen and to the frame member at suitable points thereon whereby the filter cake formed on the blanket, exposed within the frame, is substantially maintained in contact therewith during filtering and washing operations.

ARTHUR M. WILSON.
OGDEN E. CROSBY.